UNITED STATES PATENT OFFICE.

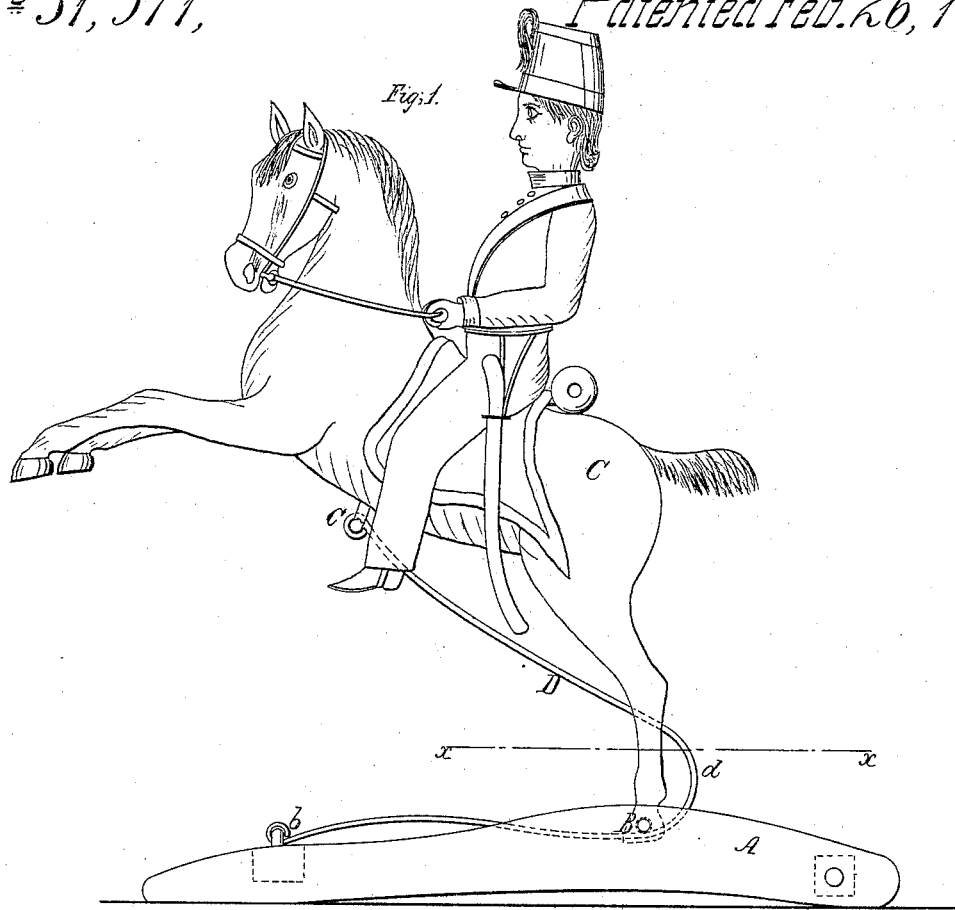
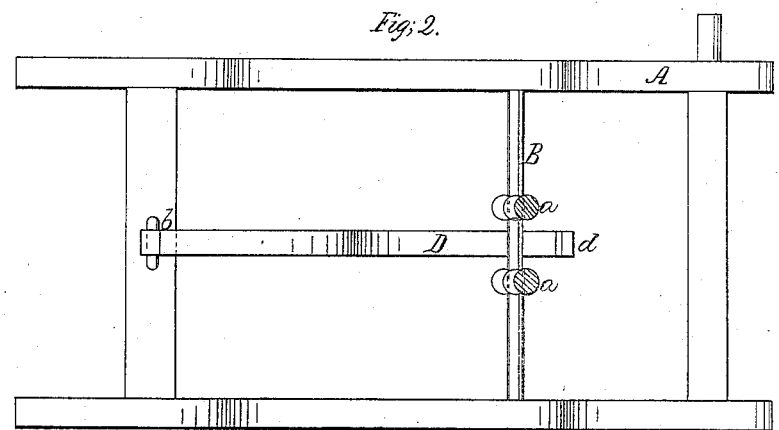

J. A. CRANDALL, OF NEW YORK, N. Y., ASSIGNOR TO MARY CRANDALL, OF SAME PLACE.

TOY HORSE.

Specification of Letters Patent No. 31,571, dated February 26, 1861.

*To all whom it may concern:*

Be it known that I, J. A. CRANDALL, of No. 478 Broadway, in the city, county, and State of New York, have invented a new and useful Improvement in Rocking Toys; and I do hereby declare that the following is a full, clear, and exact description of the same, reference being had to the annexed drawings, making a part of this specification, in which—

Figure 1 is a side view of my invention. Fig. 2, a horizontal section of the same, taken in the line *x*, *x*, Fig. 1.

Similar letters of reference indicate corresponding parts in the two figures.

This invention relates to an improvement on a rocking toy for which Letters Patent were granted to me bearing date May 17th, 1859.

To enable those skilled in the art to fully understand and construct my invention I will proceed to describe it.

A, represents a frame or base in which a shaft B, is placed transversely. On this shaft B, a toy horse C, is mounted, the shaft passing loosely through the hoofs *a*, *a*, of the hind legs, the horse having a rampant position.

D, is a spring which may be constructed of a flat steel bar properly tempered and bent in V-form. One end of this spring is attached to the front part of the frame or base A, as shown at *b*, and the spring extends around or underneath the shaft B, and upward to the horse C, the upper end of the spring being attached to the under part or belly of the horse as shown at *c*, in Fig. 1. The tension, form and position of the spring D, is such that the horse, when not subjected to the load of the rider, will be retained in a rampant position, but when subjected to a load the spring will, by a slight exertion of the rider, cause the horse to rock or vibrate. The shaft B, performs an important function as it retains the spring D, in proper position preventing its back or curved end *d*, from rising a contingency which would otherwise occur under the downward movement of the horse and which would materially interfere with the proper action of the spring.

It will be seen that this is an exceedingly simple device and that it may be very cheaply constructed, a single spring being only required.

It is immaterial whether the hoof *a*, of the horse be placed loosely on the shaft D, so that they may work thereon or whether they be fixed permanently on the shaft and the latter allowed to rotate in its bearings, the same effect is obtained in either case.

I would remark that a box or seat may be attached to the spring D, and shaft B, instead of the horse C. The former might be preferred by many as children too young to ride on the horse could be safely placed in a box or seat.

Having thus described my invention, I claim and desire to secure by Letters Patent—

The particular arrangement of the spring D with the horse C and rock shaft B, when the hind feet of the horse are attached to said shaft B and the whole is constructed as set forth.

JESSE A. CRANDALL.

Witnesses:
JAMES LAIRD,
LEWIS A. TUCKER.